United States Patent
Wenthold et al.

(10) Patent No.: US 6,261,457 B1
(45) Date of Patent: Jul. 17, 2001

(54) METHOD AND PRODUCT FOR CLEANING HOLLOW FIBER MATERIAL AND FILTER

(75) Inventors: Randal Marvin Wenthold, Belle Plaine; Christopher Gary Rasset, Maple Lake; Scott Blair Wright, Minneapolis, all of MN (US)

(73) Assignee: Minntech Corporation, Minneapolis, MN (US)

( * ) Notice: Subject to any disclaimer, the term of this patent is extended or adjusted under 35 U.S.C. 154(b) by 0 days.

(21) Appl. No.: 09/439,083

(22) Filed: Nov. 12, 1999

(51) Int. Cl.$^7$ .................................................. B01D 65/06
(52) U.S. Cl. .................... 210/636; 210/500.41; 210/650; 134/22.19; 562/607
(58) Field of Search ...................................... 210/106, 108, 210/321.69, 321.86, 407, 409, 500.23, 500.44, 636, 650, 741, 797; 422/28; 562/2, 607; 134/22.14, 22.19

(56) References Cited

U.S. PATENT DOCUMENTS

| | | | |
|---|---|---|---|
| 4,517,081 | 5/1985 | Amiot et al. | 210/85 |
| 4,721,123 | 1/1988 | Cosentino et al. | . |
| 5,112,487 | 5/1992 | Himeshima et al. | 210/500.28 |
| 5,279,735 | 1/1994 | Cosentino et al. | 210/321.69 |
| 5,310,524 | 5/1994 | Campbell et al. | . |
| 5,344,652 | 9/1994 | Hall, II et al. | 424/405 |
| 5,400,818 | 3/1995 | Cosentino et al. | 137/557 |
| 5,431,817 | 7/1995 | Braatz et al. | 210/490 |
| 5,508,046 | 4/1996 | Cosentino et al. | 424/616 |
| 5,605,627 | 2/1997 | Carlsen et al. | 210/321.79 |
| 5,635,195 | 6/1997 | Hall, II e tal. | 424/405 |
| 5,656,302 | 8/1997 | Cosentino et al. | 424/616 |
| 5,762,798 | 6/1998 | Wenthold et al. | 210/500.23 |
| 5,840,343 | 11/1998 | Hall, II et al. | 424/616 |
| 5,851,483 | * 12/1998 | Nicolle et al. | 422/28 |
| 6,077,435 | * 6/2000 | Beck et al. | 210/741 |
| 6,110,369 | * 8/2000 | Ditter et al. | 210/500.41 |

OTHER PUBLICATIONS

Ouseph et al., "Maintaining Blood Compartment Volume in Dialyzers Reprocessed With Peracetic Acid Maintains Kt/V But Not $\beta_2$-Microglobulin Removal", AJKD American Journal of Kidney Diseases, vol. 30, No. 4, Oct. 1997, pp. 501–506.

Cappelli et al., "Retention of Limulus Amoebocyte Lysate Reactive Bacterial Products by Polysulfone Dialyzers Is Affected by the Type of Disinfectant", ASAIO Journal, 1998, pp. M587–M591.

Cheung et al., "Effects of Hemodialyzer Reuse of Clearances of Urea and $\beta_2$-Microglubulin", Journal of the American Society of Nephrology, vol. 10, No. 1, Jan., 1999, pp. 117–127.

Brochure for RENATRON II Dialyzer Reprocessing System, Renal Systems, Division of Minntech Corporation, 4 pages, 1996.

* cited by examiner

Primary Examiner—Joseph W. Drodge
(74) Attorney, Agent, or Firm—Nixon & Vanderhye PC

(57) ABSTRACT

A peracetic acid disinfectant is used to clean particulate inorganic materials such as calcium and magnesium from fibers and filters. The method allows polysulfone filtens in particulate to be reused after soaking for at least about 18 hours, and most preferably at least about 24 hours, in the peracetic acid based solution. The cleaned filters have been shown to have a reuse life of in excess of 30% and up to about 60–80% of the original life of the filter. The peracetic acid solution and method may be used to clean both hollow fiber and pleated polysulfone filters.

22 Claims, 5 Drawing Sheets

METHOD AND PRODUCT FOR CLEANING HOLLOW FIBER MATERIAL AND FILTER

This invention relates to cleaning hollow fibers and filters and, more particularly, to a method and product for cleaning polysulfone, hollow fibers and filters with a peracetic acid solution.

BACKGROUND AND SUMMARY OF THE INVENTION

Water filters are typically disposed of after a single use; they are not typically cleaned and reused. The invention provides for the use of a peracetic acid disinfectant to clean particulate inorganic materials such as Calcium and Magnesium from hollow fibers and filters, particularly those formed from polysulfone, so that the filters may be reused. More specifically, the invention provides a method for soaking the filter material for 24 hours in a peracetic acid based solution, for example, a 1% Minncare® solution (available from Minntech Corporation, Minneapolis, Minn.), i.e., a 1% diluted solution of about 20% hydrogen peroxide, about 4% peracetic acid and water (peracetic acid), more specifically about 22% hydrogen peroxide, about 4.5% peracetic acid and water (peracetic acid). Both hollow fiber and pleated polysulfone filters may be cleaned with the peracetic acid solution in accordance with the method of the invention. Polysulfone filters cleaned in this manner have a reuse life of about 60%–80% of the original life of the filter. Other filters with different materials of construction may be soaked in the peracetic acid based solution in accordance with the method of the invention, but do not exhibit the dramatic reusability realized by soaking the polysulfone filter materials.

Heretofore Minncare® and other peracetic acid solutions have been used and marketed as sanitizing agents and are known and used to sanitize reverse osmosis membranes and water systems. To the inventors' knowledge, such solutions have not been known to be useful for nor used for cleaning particulate materials from filter membranes, thereby to clean the filters for reuse. Moreover, sanitizing only requires about 30 minutes of soaking and no significant cleaning occurs during the 30 minutes typically used for sanitizing.

BRIEF DESCRIPTION OF THE DRAWINGS

The above summarized invention, and the advantages thereof will be more completely understood and appreciated by careful study of the following more detailed description of presently preferred exemplary embodiments of the invention taken in conjunction with the accompanying drawings, in which.

DETAILED DESCRIPTION OF THE INVENTION

FiberFlo® products, which comprise polysulfone hollow fibers, and competitive cartridge filters were installed to filter Plymouth, Minn. city water. All cartridge filters in this study are 0.2 µm rated, except the Millipore Durapore Z, which is 0.02 µm. The product specifications for the Fiber-Flo® product and for the competitive cartridge filters are listed below in TABLE 1.

TABLE 1

COMPETITIVE FILTER TEST SUMMARY PRODUCT SPECIFICATIONS

Fibercor FiberFlo 200

Materials of Construction

| | |
|---|---|
| Hollow Fiber Membrane | Polyphen ® Polysulfone |
| Casing, core, end caps | polypropylene |
| End seals | Polyurethane |
| Standards O-rings | Silicone |
| Filtration Area | 16 ft$^2$ (1.5 m$^2$) per 10 in. cartridge |

U.S. Filter VS Series FCVS010S2

Materials of Construction

| | |
|---|---|
| Cartridge | Polypropylene caps, core and cage |
| Media | Pleated, polyethersulfone w/polypropylene support media |
| Seals | Silicone O-rings |

Dimensions

| | |
|---|---|
| Diameter | 2.75 in. (7.0 cm) |
| Length | 10 in. (24.5 cm) |

Memtec Vara-Fine VFSG Series VFSG200-10M3S

Materials of Construction

| | |
|---|---|
| Filter Media | Patented highly asymmetric polysulfone |
| Surface Treatment | Hydroxypropylcellulose |
| Core, cage and end caps | Polypropylene |
| Support layers | Polypropylene |
| O-rings | Silicone |

Dimensions

| | |
|---|---|
| Diameter | 2.6 in. (6.6 cm) |
| Length | 10 in. (25.4 cm) |

Filterite Poly-Fine Series II PFT0.2-1OUS-10M3S

Materials of Construction

| | |
|---|---|
| Filter Media | PFT0.2: highly asymmetric polysulfone |
| Core, cage and end caps | Polypropylene |
| O-rings | Silicone |

Dimensions

| | |
|---|---|
| Diameter | 2.6 in. (6.6 cm) |
| Length | 10 in. (25.4 cm) |

Pall Utipor N$_{66}$ AB1NA3PH4

Materials of Construction

| | |
|---|---|
| Membrane | Nylon 6,6, single layer |
| Support/end caps | Polyester |
| Core/cage | Polypropylene |

TABLE 1-continued

COMPETITIVE FILTER TEST SUMMARY PRODUCT SPECIFICATIONS

| | |
|---|---|
| O-rings | Silicone |
| Dimensions | |
| Diameter | 2.75 in. (7.0 cm) |
| Length | 10 in. (25.4 cm) |
| Filtration Area | 9.0 ft$^2$ (8400 cm$^2$) |
| Millipore Durapore Z CPVV01TPZ | |
| Materials of Construction | |
| Membrane | Positively-charged hydrophilic Durapore PVDF |
| Core, cage and end caps | Pleated Polypropylene |
| O-rings | Viton |
| Effective Filtration Area | 10 in. cartridge 7.4 ft$^2$ (7000 cm$^2$) |
| Cuno Zetapor 70012-01A-020SP | |
| Materials of Construction | |
| Membrane | Nylon 6,6 |
| Support/end caps | Polyester |
| Core/cage | Polypropylene |
| Dimensions | |
| Diameter | 2.8 in. (7.1 cm) |
| Length | 10 in. (25.4 cm) |
| Surface Area | 6.5 ft$^2$ (6000 cm$^2$) |
| Meissner Stylux SM0.2-1F2S | |
| Materials of Construction | |
| Membrane | Polyethersulfone |
| Support/end caps | Polypropylene |
| Core/cage | Polypropylene |
| Dimensions | |
| Diameter | 2.75 in. (7 cm) |
| Length | 10 in. (25.4 cm) |

Figure 2:
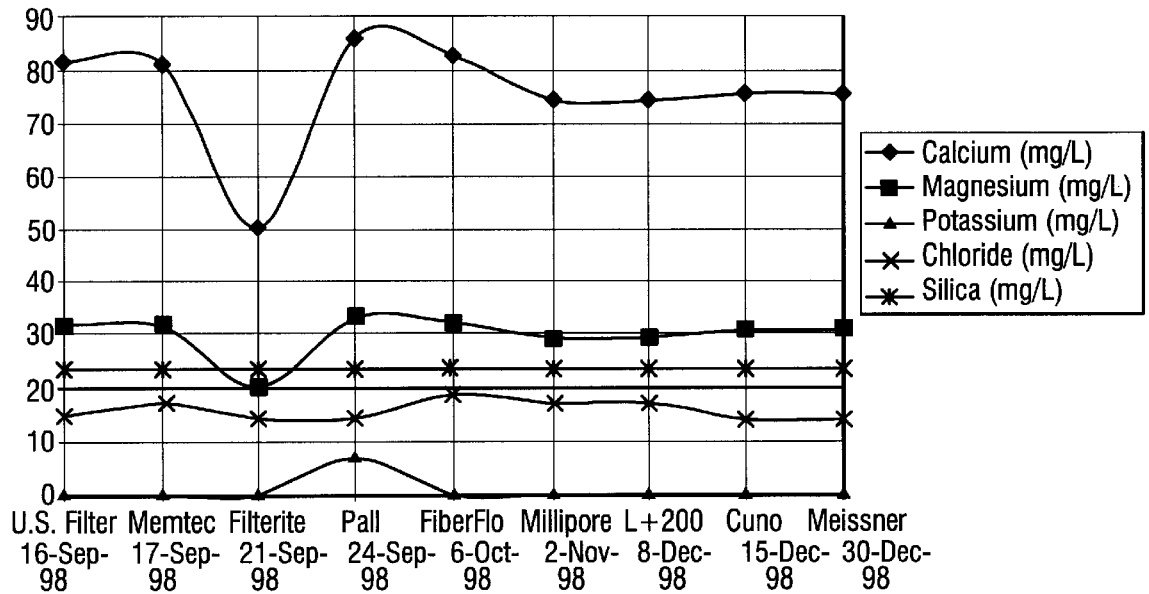
FIG. 2 is a graph showing city water analysis using each of the test filter devices.

All filters were installed to filter Plymouth city water at 3 gpm until a differential pressure of 30 psig was established across each filter cartridge. This maximum differential pressure was defined as the end of useful process service for the filters studied. FIG. 2 represents the concentration of solids in Plymouth city water, which were monitored during the first part of this study.

Figure 1:
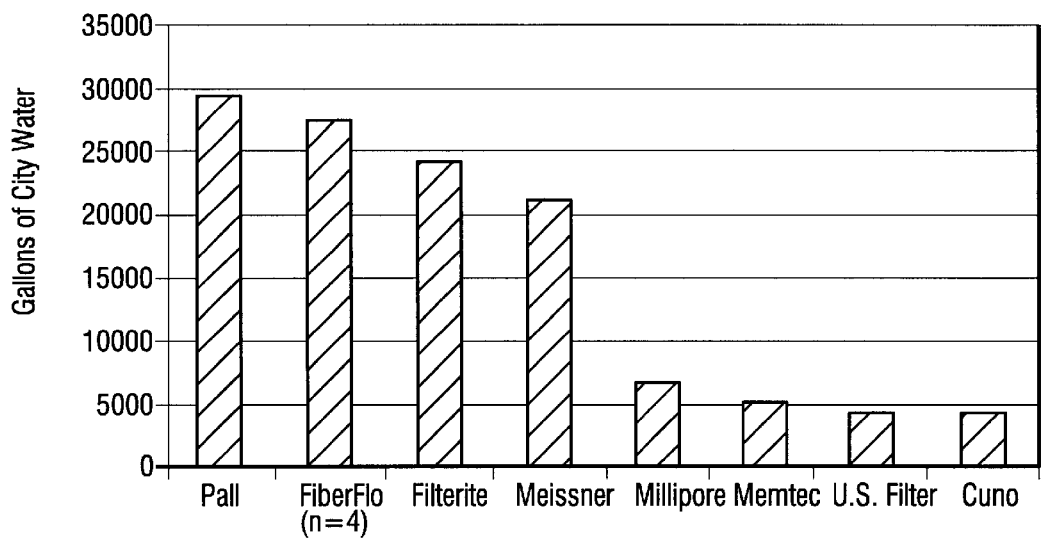
FIG. 1 is a bar graph showing gallons of city water filtered by each of several test filter devices.

It can be seen from FIG. 1 that the polysulfone Fiberflo® cartridge filter is one of the top two filters in this evaluation of filter cartridge life. The Polyphen® hollow fibers used in all FiberFlo® hydrophilic filter devices is manufactured by Minntech Corporation using U.S. Patent No. 5,762,798, the disclosure of which is incorporated herein by this reference. The asymmetric hollow fiber provides for absolute micron removal rating, large surface area, superior flow rates and a wide range of chemical compatibility.

Figure 4:
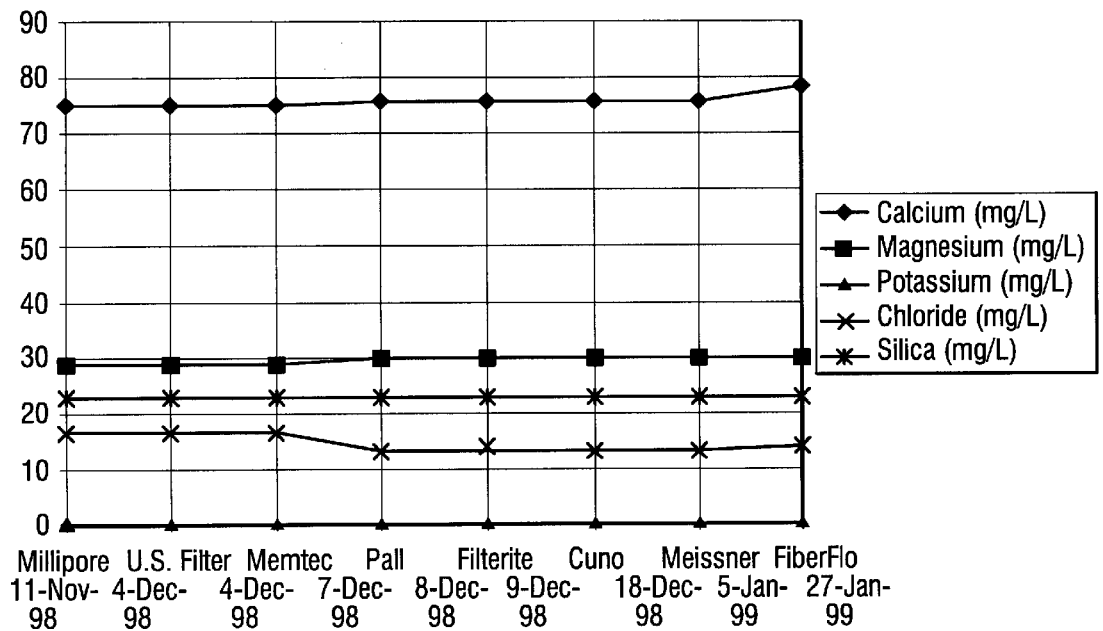
FIG. 4 is a graph showing city water analysis following the 24 hour 1% Minncare® soak in accordance with the invention.

When each filter established a 30 psig differential pressure filtering Plymouth city water it was removed from the filter housing and placed in a 1% Minncare® Cold Sterilant solution for 24 hours. The Minncare® Cold Sterilant was periodically checked to verify the concentration. Each filter's integrity was then tested by the Diffusive Flow method. All units had integrity following the 24 hour Minncare® exposure. Each filter was then installed in a filter housing to filter Plymouth city water at 3 gpm until a differential pressure 30 psig was again established across each filter cartridge. FIG. 4 represents the concentration of solids in Plymouth city water, which were monitored during the second part of this study, following the cleaning of each filter with the 1% Minncare® solution.

Figure 3:
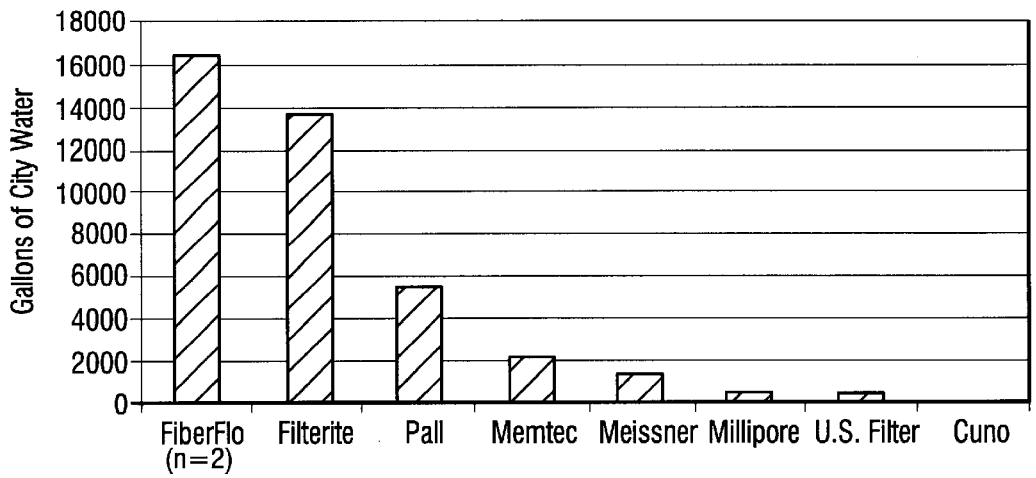
FIG. 3 is a bar graph showing gallons of city water filtered by each test filter device following a 24 hour 1% Minncare® soak in accordance with the invention.

FIG. 3 shows that, remarkably, the Fiberflo® hollow fiber polysulfone filter cartridge can be sanitized and cleaned with the Minncare® Cold Sterilant and put back into service and out perform any other competitive cartridge filter included in this study. In most cases the FiberFlo® filter cartridge dramatically out performed the competitive devices upon reuse.

TABLE 2 demonstrates that following a 24 hour static soak in Minncare®, the polysulfone hollow fibers are cleaned and can be reused up to about 80% of the original life cycle of the original filter. As also shown in TABLE 2, soaking the filters for substantially in excess of 24 hours has substantially no further effect on the reuse life.

TABLE 2

| Unit lot # | initial # gals | Treatment | Post treatment # gals | % of initial |
|---|---|---|---|---|
| 107854 | 23,310 | 96 hr. 1% Minncare ® | 18,720 | 80.3 |
| 109124 | 17,505 | 24 hr 1% Minncare ® | 14,235 | 81.3 |

TABLE 3, below, shows that lesser durations of treatment are substantially less effective than a 24 hour 1% Minncare® soak and that an NaOH backflush treatment increased the efficacy of the 1 hour soak but reduced the efficacy of the 24 hour soak. We suspect that this is because the NaOH (which was not a special grade of purity), although an aggressive high pH material commonly used for cleaning systems in the food and biotech industries, is actually a very "dirty" cleaner with perhaps large particles of ash. The backflush would push the ash particles into the small pores of the filter first and perhaps seal off passages or exposure to Minncare®.

In the case of the Unit lot # 104596 filter, the 1 hour and 3 hour soak treatments were carried out in succession. Specifically, the filter was installed in a filter housing to filter Plymouth city water at 3 gpm, until a differential pressure 30 psig was established across the filter cartridge. When the filter established a 30 psig differential pressure filtering Plymouth city water, the flow volume was recorded and the filter was removed from the filter housing and placed in a 1% Minncare® Cold Sterilant solution for 1 hour. The filter was then installed in a filter housing to filter Plymouth city water at 3 gpm until a differential pressure 30 psig was again established across the filter cartridge. The post treatment number of gallons/liters was then recorded. The filter was then removed from the filter housing and placed in a 1% Minncare® Cold Sterilant solution for 3 hours. The filter was then installed in a filter housing to filter Plymouth city water at 3 gpm until a differential pressure 30 psig was again established across the filter cartridge. The post treatment number of gallons/liters was then recorded.

TABLE 3

| Unit lot # | Initial Vol. | Treatment | Post treatment | % of initial |
|---|---|---|---|---|
| 104596 | 25,380 gal | 1 hr 1% Minncare ® | 180 gal | .71 |
| 104596 | 25,380 gal | 3 hr 1% Minncare ® | 1,260 gal | 4.96 |
| Unit #1 | 18,630 gal | 6 hr 1% Minncare ® | 4,500 gal | 24.15 |
| Unit #2 | 12,420 gal | 18 hr 1% Minncare ® | 5,040 gal | 40.58 |
| 109124–001 | 17,505 gal | 24 hr 1% Minncare ® | 14,235 gal | 81.32 |
| 109387–100 | 29,970 gal | NaOH backflush 1 hr 1% Minncare ® | 20,430 gal | 68.17 |
| 109387–108 | 38,970 gal | NaOH backflush 24 hr 1% Minncare ® | 17,910 gal | 45.96 |

Figure 5:
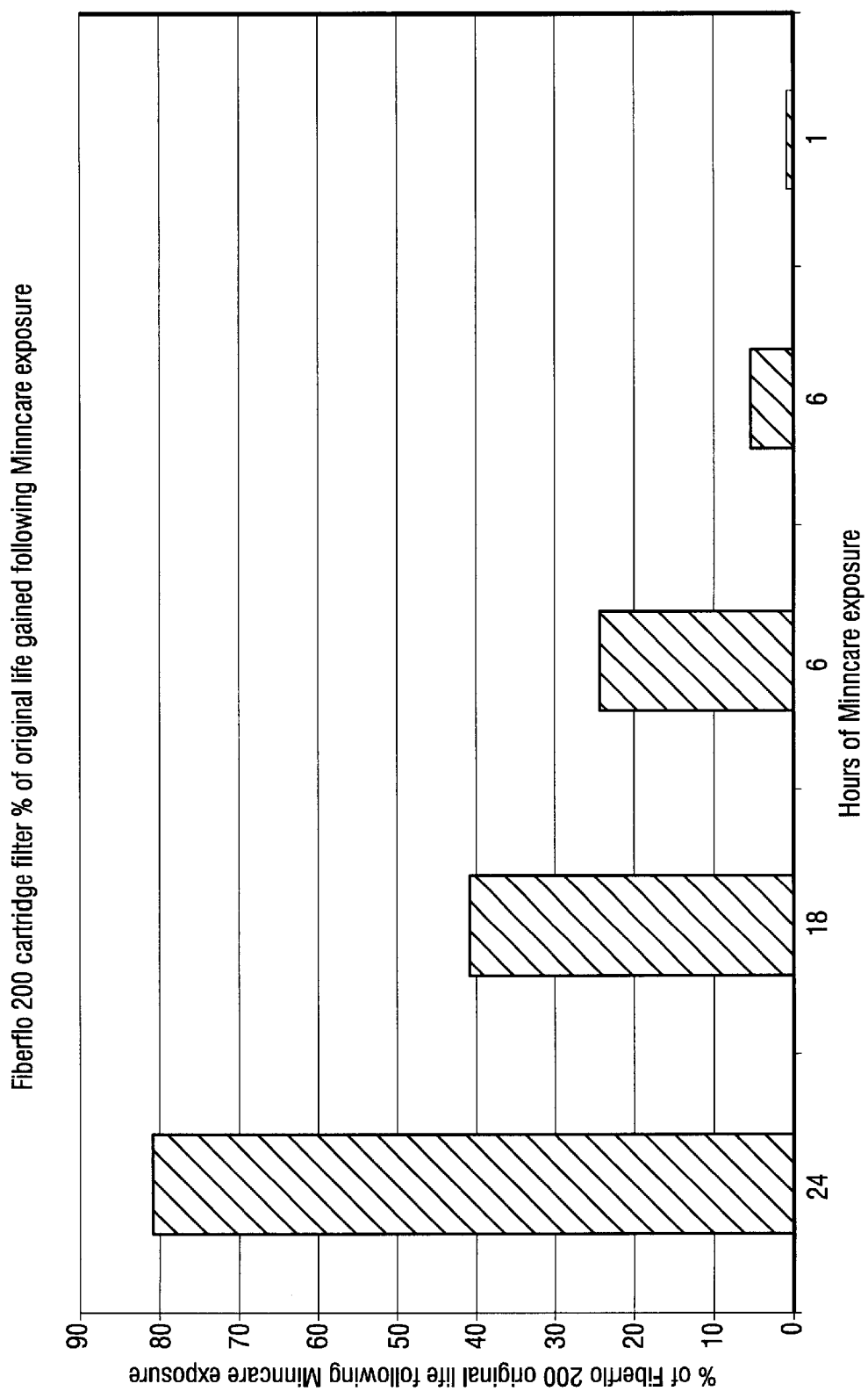
FIG. 5 is a bar graph of Percent (%) of original life following a 1% Minncare® soaks of various durations.

The results reported in Table 3 are summarized in the bar graph of FIG. 5, which illustrates the percent (%) of original life gained following Minncare® exposure for various periods. The expected reuse life needed to 'break even' is at least about 25% of the original life of the filter. The minimum reuse life deemed cost effective to the customer is of course dependent upon the type of filter as well as the associated cost for additional labor and downtime. Moreover, a substantial increase in reuse life can be realized with a modest additional time investment. Thus it is contemplated that to be clearly cost effective, a soak time of at least about 18 hours is appropriate, and most preferably, the soak time is at least about 24 hours.

In further investigation and demonstration of effectiveness of the use of peracetic acid as a cleaning solution, in accordance with the invention, a Fiberflo® capsule filter product was tested in a manner similar to that described above. More specifically, a capsule filter product having the specifications identified in TABLE 4 was tested.

TABLE 4

FIBER-FLO ® HOLLOW FIBER CAPSULE FILTER PRODUCT

| Materials of Construction | |
|---|---|
| Hollow Fiber Membrane | Polyphen ® Polysulfone |
| Casing and End Caps | Polycarbonate |
| End Seals | Polyurethane |
| Luer Caps | Polypropylene |
| Sealing method | Ultrasonic Welding |
| Connections | |
| Large (L) Capsule | ¼ in. NPT, ⅜ in. NPT, ½ in. Hose barb, 1-½ in. Sanitary, ISO |
| Effective Filtration Area | |
| Large (L) Capsule | 5500 cm² (6.0 ft²) |

The primary difference between the capsule and the cartridge filter product is surface area (6.0 ft² and 16 ft², respectively). Capsule filters have a U-shaped fiber bundle whereas cartridges have a straight inserted fiber bundle.

Figure 6:
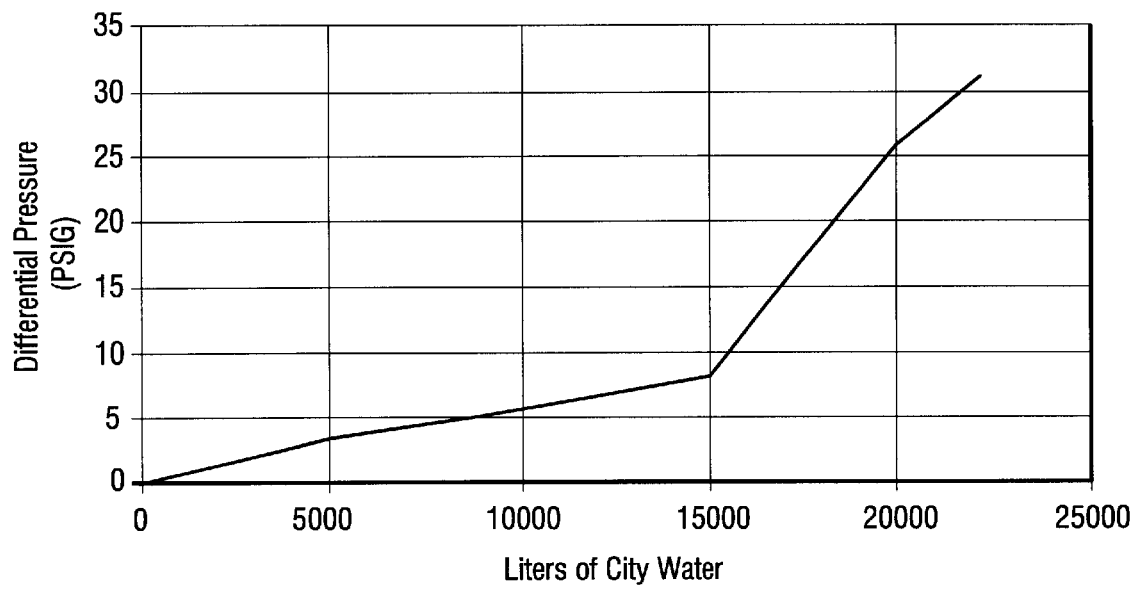
FIG. 6 is a graph of differential pressure versus liters of city water for a capsule filter (new)

In connection with this investigation, a large 0.2 micrometer inline Fiberflo® hollow fiber capsule filter (L-I-200-A) was installed to filter Plymouth, MN city water at 2 lpm until a differential pressure of 30 psig was established across the filter membrane. This maximum differential pressure was defined as the end of useful process service life for the filter tested. FIG. 6 shows that the L-I-200-A filtered 22,140 liters of Plymouth city water before the maximum differential pressure was established. TABLE 5 below represents the concentration of solids in Plymouth city water, which were monitored during the first part of this study.

TABLE 5

PLYMOUTH, MN CITY WATER ANALYSIS

| Calcium | 74.2 mg/L |
|---|---|
| Magnesium | 28.9 mg/L |
| Potassium | 0 mg/L |
| Chloride | 16.6 mg/L |
| Silica | 23 mg/L |
| Hardness | 21 gpg |

Once the capsule filter established a 30 psig differential pressure, a 1% Minncare® Cold Sterilant solution was injected into the capsule and allowed to dwell for 24 hours. The Minncare® Cold Sterilant solution was periodically checked to verify the concentration. The integrity of the capsule filter was then verified by the Diffusive Flow method. The capsule filter was then placed back online to filter Plymouth city water at 2 lpm until a differential pressure 30 psig was again established across the capsule filter membrane. TABLE 6 below represents the concentration of solids in Plymouth city water which were monitored during the second part of this study, following the cleaning of the filter capsule with Minncare®.

TABLE 6

PLYMOUTH, MN CITY WATER ANALYSIS

| Calcium | 75.4 mg/L |
|---|---|
| Magnesium | 30.3 mg/L |
| Potassium | 0 mg/L |
| Chloride | 13.3 mg/L |
| Silica | 23 mg/L |
| Hardness | 21 gpg |

Figure 7:
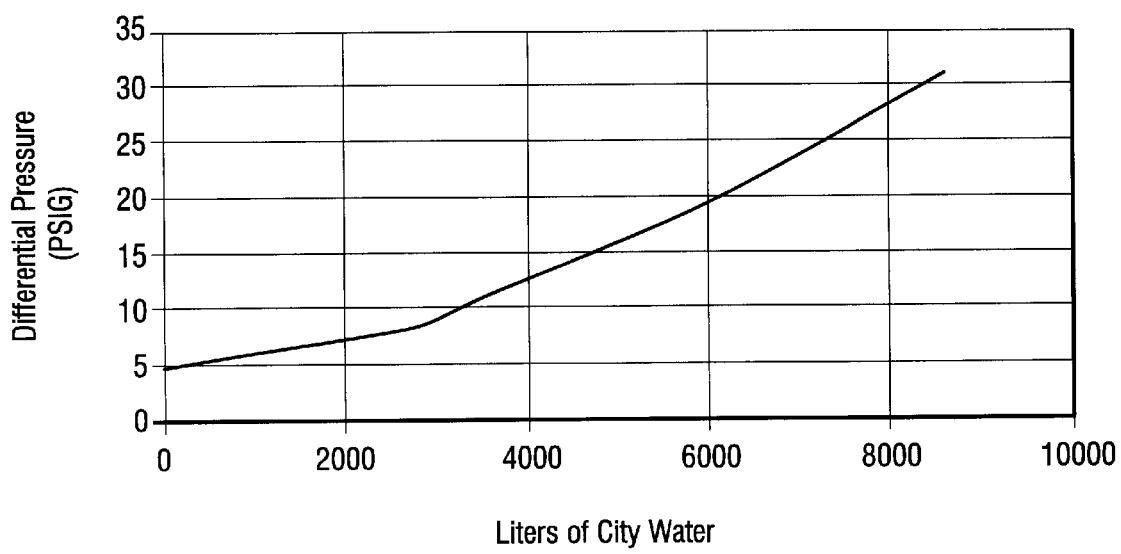
FIG. 7 is a graph of differential pressure versus liters of city water for the capsule filter of FIG. 6, following a 24 hour 1% Minncare® soak.

FIG. 7 shows that the FiberFlo® hollow Fiber Capsule filter can effectively be sanitized and cleaned with Minncare® Cold Sterilant and put back into service. However, the reuse effect was only about 30–40% of the original life cycle.

Later, another Fiberflo® capsule was tested and subject to an alternate cleaning method in accordance with the invention. More specifically, another Fiberflo® capsule was installed to filter Plymouth, Minn. city water at 2 lpm until a differential pressure of 30 psig was established across the filter membrane. The pre-cleaning life (volume in gallons) is shown as the bar graph on the right in FIG. 8. This capsule filter was then cleaned in a three step process, in accordance with an alternate embodiment of the invention, which subjects the capsule filter to two discrete cycles on a Renatron® (high flux), which is an embodiment of the reprocessor disclosed in U.S. Pat. No. 4,517,081, the disclosure of which is incorporated herein by this reference. The Renatron® automated processing system is available from Renal Systems, a division of Minntech Corporation, and is known and used for reprocessing dialyzers, particularly with Renalin® cold sterilant. The Renatron® system conventionally cleans (that is sanitizes and removes blood proteins and cells that result from blood exposure), rinses, and tests membrane integrity and blood compartment volume and then fills the dialyzer with sterilant. The Renalin® sterilant destroys all microorganisms, viruses, bacteria spores and fungi present in the dialyzers. Renalin® has substantially the same composition as Minncare® but conventional Renalin® use solutions are stronger than conventional Minncare® use solutions. More particularly, Renalin® is a commercial peracetic acid-hydrogen peroxide concentrate, that is available from Minntech Corporation of Minneapolis, Minn., prediluted to a stock solution. Renalin® contains about 20% hydrogen peroxide, about 4% peracetic acid and water. More specifically, Renalin® has a nominal composition in the concentrate of about 23% hydrogen peroxide, 5% peracetic acid and 90% acetic acid and balance water. The stock solution is diluted depending on the intended use of the solution, typically to 2.0 to 3.6% dilution. Percents expressed herein are weight percents; however, Renaline® sterilant is typically diluted on a volume basis by users.

To clean the Fibeiflo® capsule, the capsule was 'cleaned' in one cycle on the Renatron® using Renalin®. A cycle on the Renatron® may be summarized as follows:

(1) The machine draws up the required amount of Renalin® solution into the tank by weight. The Renalin® solution is diluted with water to a 2.0% by weight Renalin®.

(2) The machine flushes the Renalin® solution from the inside of the fibers to outside of the fibers using the inline capsule configuration that was part of this study. Note: If the capsule configuration would have been a crossflow (dialyzer type construction) model the Renalin® solution flush would have been only on the inside of the fibers.

(3) The machine then flushes the Renalin® solution from the outside of the fibers to the inside of the fibers. Note: This flow pattern would remain the same regardless of capsule configuration type.

(4) The machine draws Renalin® solution into the space between the capsule case and the outside of the fibers if the capsule is an inline configuration. The machine draws Renalin® solution into the inside of the fibers if it is a crossflow configuration. The solution is allowed to dwell for 120 seconds with no circulation.

(5) Flush and fill the outside of the fibers with water for 15 seconds.

(6) Flush and fill the inside of the fibers with water for 30 seconds.

(7) Flush the inline capsule configuration from inside the fibers to outside the fibers for 60 seconds. Note: If the capsule is a crossflow configuration the flush is only on the inside of the fibers but the direction has been reversed from previous flush cycles.

(8) Drain the space between the case and the outside of the fibers in the inline configuration. Drain the inside of the fibers if the configuration is a crossflow.

(9) The machine then pulls a vacuum to −250 mmHg and observes the pressure decay over 40 seconds. If the decay is greater than 1.25 mmHg per second, the device is pronounced a failure. This would indicate a single or greater number of fibers is no longer integral or there is a loose connection to the machine.

(10) The machine then draws in Renalin® solution and dilutes it with water.

(11) There is a 15 second flush of water on the outside of the fibers in any configuration of capsule filter, followed by a water flush for 30 seconds from the outside of the fiber to the inside of the fiber for inline configurations and from one end of the inside of the fiber to the other end of the inside of the fiber for crossflow models.

(12) The machine then fills the outside of the fibers and the inside of the fibers with 3.25% by weight Renalin® solution. The cycle is now complete.

Normally a filter would be removed within ½ hour of the complete Renatron® cycle, although it may sit for a longer period. In accordance with the inventive cleaning process, at the conclusion of the Renatron® cycle, the Renalin® was drained and then the capsule filter was soaked for 24 hours in a 1% Minncare® Cold Sterilant solution. The capsule was then subject to a further single cycle on the Renatron®. After cleaning, the capsule filter was placed back online to filter Plymouth city water at 2 lpm until a differential pressure 30 psig was again established across the capsule filter membrane. The post cleaning life (volume) is shown as the bar graph on the right in FIG. 9.

Figure 8:
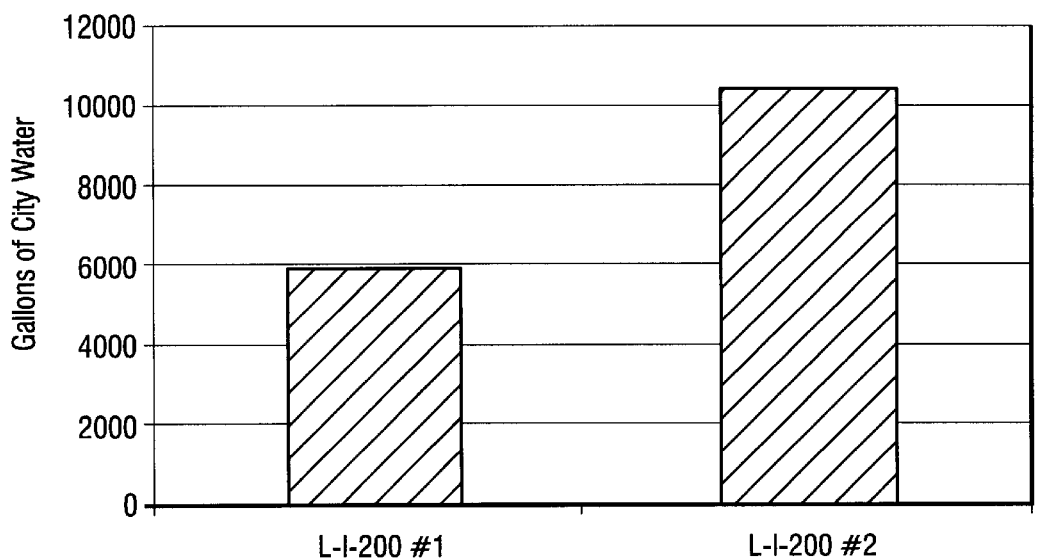
FIG. 8 is a bar graph comparing first and second new capsule filters.
Figure 9:
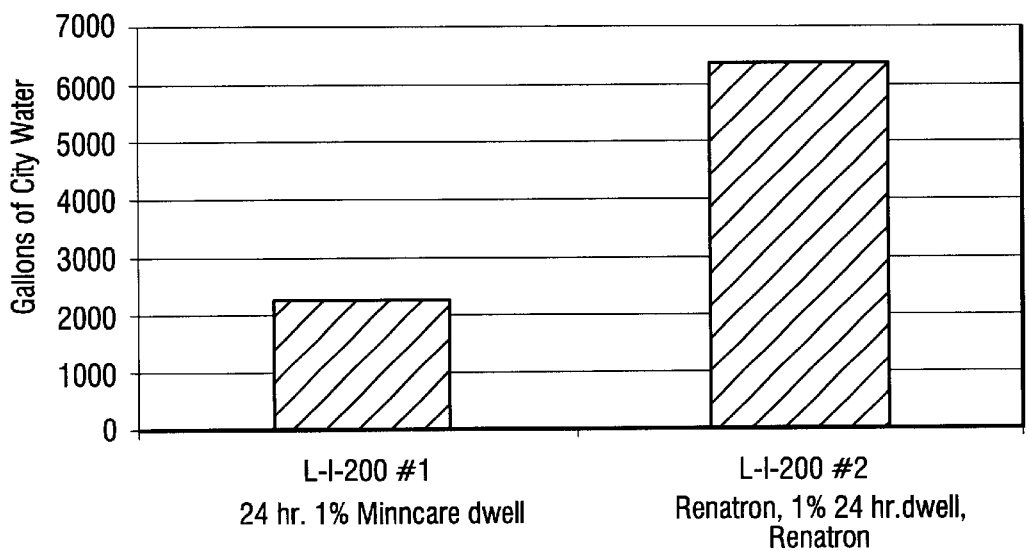
FIG. 9 is a bar graph comparing the filter capsules of FIG. 8 following cleaning treatment with Minncare® in accordance with first and second embodiments of the invention.

For comparison, the data presented above in FIGS. 6 and 7 is reproduced, respectively, in FIGS. 8 and 9 as the bar on the left, with the unit liters converted to gallons. As can be seen, the three step cleaning sequence resulted in an approximate 60% reuse life of the capsule filter as compared to the 30–40% achieved for simple filter static soak. Thus, the system may be used to effectively clean capsule devices better than the single soak step alone. As Renalin® has the same composition as Minncare®, the improvement in reuse life appears to be related to the flow action in the Renatron®. Reprocessing cycles both before and after the Minncare® soak are described herein above and are preferred, but not required. However, it was evident that for capsule filters, the Renatron® cycle is necessary to achieve results of greater than 30–40% reuse life. Moreover it is expected that there would be less of an improvement with one cycle rather than two. We would suspect that the Renatron® cycle after soaking would be the most beneficial since the filter would have been cleaned already by the soaking and the Renatron® cycle would then help flush and remove additional material.

The Renatron® may be easily modified to clean cartridge filters and using the Renatron® to clean cartridge filter devices would be expected to result in an even greater percentage reuse life. In that regard, on a cartridge filter, the construction of the filter with the straight fiber bundle would be expected to lend itself to be cleaned even better if a Renetron cycle was used.

While the invention has been described with reference in particular to a static soak of at least about 18 hours and more preferably of about 24 hours in 1% Minncare®, either Minncare® or Renalin®, or any other such known peracetic acid solution may be used in accordance with the invention.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of cleaning a used filter media that comprises polysulfone, comprising the steps of:
   soaking the used filter media in a peracetic acid solution for a period of time sufficient to clean the filter media so that the filter media can thereafter be reused for a period of at least about 30% of an original period of use of the filter media, wherein said step of soaking comprises soaking the filter media for at least about 18 hours.

2. A method of cleaning a filter media as in claim 1, wherein the filter media comprises hollow fiber membranes.

3. A method of cleaning a filter media as in claim 1, wherein the filter media is a pleated filter membrane.

4. A method of cleaning a filter media as in claim 1, wherein after a first cleaning for reuse the filter media has a reuse life of about 60–80% of the original life of the filter media.

5. A method of cleaning a filter media as in claim 1, wherein said peracetic acid solution comprises a 1% diluted solution of about 20% hydrogen peroxide, about 4% peracetic acid, and water.

6. A method of cleaning a filter media as in claim 1, wherein the filter media is disposed in a capsule to define a capsule filter.

7. A method of cleaning a filter media as in claim 6, further comprising reprocessing the capsule filter before the step of soaking, said reprocessing comprising:
   flushing a dilute peracetic acid solution at least from one side surface of the filter media to another side surface thereof;
   drawing said dilute peracetic acid solution into a volume defined on at least one side of the filter media and allowing said dilute peracetic acid solution to dwell for a predetermined period; and
   flushing said one side and said other side of the filter media with water for a predetermined period.

8. A method of cleaning a filter media as in claim 7, further comprising again reprocessing the capsule filter after the step of soaking.

9. A method of cleaning a filter media as in claim 1, wherein said step of soaking comprises soaking the filter media for at least about 24 hours.

10. A water filtration process comprising:

providing a filter media;

filtering water with the filter media until a predetermined differential pressure is established across the filter media;

thereafter cleaning the filter media, said cleaning step including soaking the filter media in a peracetic acid solution, whereby the filter media is cleaned for reuse; and thereafter filtering water with said cleaned filter media, wherein said cleaning step comprises soaking the filter media for at least about 18 hours.

11. A process as in claim 10, wherein the filter media comprises polysulfone.

12. A process as in claim 11, wherein the filter media is disposed in a capsule to define a capsule filter.

13. A process as in claim 12, further comprising reprocessing the capsule filter before the step of soaking, said reprocessing comprising:

flushing a dilute peracetic acid solution at least from one side surface of the filter media to another side surface thereof;

drawing said dilute peracetic acid solution into a volume defined on at least one side of the filter media and allowing said dilute peraceic acid solution to dwell for a predetermined period; and flushing said one side and said other side of the filter media with water for a predetermined period.

14. A process as in claim 13, further comprising again reprocessing the capsule filter after the step of soaking.

15. A process as in claim 10, wherein said cleaning step comprises soaking the filter media for at least about 24 hours.

16. A process as in claim 15, wherein the filter media comprises polysulfone.

17. A process as in claim 11, wherein said cleaned filter media is used to filter water substantially until said predetermined differential pressure is again established across the filter media.

18. A process as in claim 11, wherein said cleaned filter media is used for at least about 30% of a duration of the first said filtering step.

19. A process as in claim 11, wherein the filter media comprises hollow fiber membranes.

20. A process as in claim 11, wherein the filter media is a pleated filter membrane.

21. A process as in claim 11, wherein after a first cleaning for reuse said cleaned filter media is used for at least about 60–80% of a duration of the first said filtering step.

22. A process as in claim 10, wherein said peracetic acid solution comprises a 1% diluted solution of about 20% hydrogen peroxide, about 4% peracetic acid, and water.

* * * * *

UNITED STATES PATENT AND TRADEMARK OFFICE
CERTIFICATE OF CORRECTION

PATENT NO.    : 6,261,457 B1                                        Page 1 of 1
DATED         : July 17, 2001
INVENTOR(S)   : Wenthold et al.

It is certified that error appears in the above-identified patent and that said Letters Patent is hereby corrected as shown below:

Drawings,
Sheet 1 of 5, Figure 2, X-axis label, seventh item, delete "L + 200" and substitute -- L -1-200 -- therefore.
Sheet 3 of 5, Figure 5, X-axis, Hours of Minncare exposure, fourth number, delete "6" and substitute -- 3 -- therefore.

Column 5,
Line 42, delete "2 ipm" and substitute -- 2 lpm -- therefor.

Column 6,
Line 54, delete "90%" and substitute -- 9% -- therefor.
Line 57, delete "Renaline" and substitute -- Renalin -- therefor.
Line 59, delete "Fibeiflo" and substitute -- Fiberflo -- therefor.

Column 7,
Line 55, delete "2 ipm" and substitute -- 2 lpm -- therefor.

Signed and Sealed this

Twenty-fourth Day of September, 2002

*Attest:*

*Attesting Officer*

JAMES E. ROGAN
*Director of the United States Patent and Trademark Office*